(12) United States Patent
Franconi (10) Patent No.: US 10,495,233 B2
(45) Date of Patent: Dec. 3, 2019

(54) THREE-POSITION VALVE AND PNEUMATIC ACTUATOR THEREFOR

(71) Applicant: HONEYWELL INTERNATIONAL INC., Morris Plains, NJ (US)

(72) Inventor: Robert Franconi, New Hartford, CT (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 162 days.

(21) Appl. No.: 15/850,139

(22) Filed: Dec. 21, 2017

(65) Prior Publication Data

US 2019/0195385 A1 Jun. 27, 2019

(51) Int. Cl.
*F16K 31/122* (2006.01)

(52) U.S. Cl.
CPC .................................. *F16K 31/1225* (2013.01)

(58) Field of Classification Search
CPC .................................................... F16K 31/1225
See application file for complete search history.

(56) References Cited

U.S. PATENT DOCUMENTS

| | | | |
|---|---|---|---|
| 2,643,677 A * | 6/1953 | MacLean | F16K 31/1635 251/31 |
| 3,394,632 A * | 7/1968 | Priese | F15B 15/066 92/68 |
| 3,417,960 A * | 12/1968 | Stehlin | F16K 31/143 251/14 |
| 3,687,414 A * | 8/1972 | Petty | F16K 5/02 251/77 |
| 3,766,835 A * | 10/1973 | Kobelt | F01B 17/00 92/68 |
| 3,818,808 A * | 6/1974 | Shafer | F01B 1/12 92/138 |
| 3,892,381 A * | 7/1975 | Prescott | F16K 5/0647 251/26 |
| 4,170,169 A | 10/1979 | Shafer | |
| 4,852,528 A | 8/1989 | Richeson et al. | |
| 7,669,830 B2 | 3/2010 | Franconi | |

\* cited by examiner

*Primary Examiner* — Eric Keasel
(74) *Attorney, Agent, or Firm* — Lorenz & Kopf, LLP (57) ABSTRACT

A valve actuator for moving a valve element includes an actuator body, an opening piston, a closing piston, a first lost-motion link, and a second lost-motion link. The actuator body has an inner surface, a vent opening, a full-open pneumatic passageway, and a full-closed pneumatic passageway. The opening piston is movably disposed within the piston chamber between the vent opening and the full-open pneumatic passageway. The closing piston is movably disposed within the piston chamber between vent opening and the full-closed pneumatic passageway. The first lost-motion link is coupled to the opening piston and is operable to selectively rotate the valve element. The second lost-motion link is coupled to the closing piston and is operable to selectively rotate the valve element.

20 Claims, 6 Drawing Sheets

THREE-POSITION VALVE AND PNEUMATIC ACTUATOR THEREFOR

TECHNICAL FIELD

The present invention generally relates to pneumatically actuated valves, and more particularly relates to a three-position valve and a pneumatic actuator for a three-position valve.

BACKGROUND

Many current aircraft use bleed air extracted from the main propulsion engines to supply conditioned air for various pneumatic systems throughout the aircraft. This includes commercial air transport aircraft, business jets, and military aircraft that are powered by turbo-jet, turbo-fan, and turbo-prop engines. The air extracted from the main engines is supplied to and controlled by a bleed air system, which extracts air from different ports of the compressor section of the turbine engine, and directs this air to various pneumatic loads via valves and ducting.

The valves in many bleed air systems are actuated by a fluid to move at least between a full-closed position and a full-open position. To do so, pressurized fluid may be routed to a fluid actuator in which a piston or a diaphragm is pressurized to move a valve element in the flow body of the valve. Recent engine designs have specified that one or more valves in the bleed air system also be moved to an intermediate position, between the full-closed and full-open positions. More specifically, that the intermediate position is the normal position of the valve, and that the valve is moved to the full-open position or the full-closed position in response to pneumatic actuation forces. The arrangement of an actuator to implement this functionality can be complex, and hence relatively expensive.

Hence, there is a need for a fluid actuated valve that can be moved from a normal, intermediate position to the full-open and full-closed positions using an actuator that is relatively non-complex, and thus relatively less expensive.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a valve includes a valve body, a valve element, and an actuator. The valve body includes an inlet, an outlet, and a flow passage extending between the inlet and the outlet. The valve element is rotationally mounted on the valve body and is disposed within the flow passage. The valve element is rotatable between a preset partial-open position, in which fluid is allowed to flow through the flow passage at a first flow rate, a full-open position, in which fluid is allowed to flow through the flow passage at a second flow rate that is greater than the first flow rate, and a full-closed position in which fluid is at least substantially restricted from flowing through the flow passage. The actuator is coupled to the valve element, and is configured to selectively receive a pneumatic actuation force and to move the valve element to the preset partial-open position when the pneumatic actuation force is not being received, and move the valve element to one of the full-open position or the full-closed position when the pneumatic actuation force is being received. The actuator includes an actuator body, an opening piston, a closing piston, a first lost-motion link, and a second lost-motion link. The actuator body has an inner surface, a vent opening, a full-open pneumatic passageway, and a full-closed pneumatic passageway. The inner surface defines a piston chamber. The vent opening extends through the actuator body from a first position in the piston chamber. The full-open pneumatic passageway extends through the actuator body from a second position in the piston chamber and is configured to selectively receive the pneumatic actuation force. The full-closed pneumatic passageway extends through the actuator body from a third position in the piston chamber and is configured to selectively receive the pneumatic actuation force. The opening piston is movably disposed within the piston chamber between the vent opening and the full-open pneumatic passageway. The closing piston is movably disposed within the piston chamber between vent opening and the full-closed pneumatic passageway. The first lost-motion link is coupled to the opening piston and is operable to selectively rotate the valve element. The second lost-motion link is coupled to the closing piston and is operable to selectively rotate the valve element.

In another embodiment, a valve actuator for moving a valve element includes an actuator body, an opening piston, a closing piston, a first lost-motion link, and a second lost-motion link. The actuator body has an inner surface, a vent opening, a full-open pneumatic passageway, and a full-closed pneumatic passageway. The inner surface defines a piston chamber. The vent opening extends through the actuator body from a first position in the piston chamber. The full-open pneumatic passageway extends through the actuator body from a second position in the piston chamber and is configured to selectively receive the pneumatic actuation force. The full-closed pneumatic passageway extends through the actuator body from a third position in the piston chamber and is configured to selectively receive the pneumatic actuation force. The opening piston is movably disposed within the piston chamber between the vent opening and the full-open pneumatic passageway. The closing piston is movably disposed within the piston chamber between vent opening and the full-closed pneumatic passageway. The first lost-motion link is coupled to the opening piston and is operable to selectively rotate the valve element. The second lost-motion link is coupled to the closing piston and is operable to selectively rotate the valve element.

In yet another embodiment, a valve actuator for moving a valve element includes an actuator body, an opening piston, an opening piston stop, a closing piston, a closing piston stop, a first lost-motion link, and a second lost-motion link. The actuator body has an inner surface, a vent opening, a full-open pneumatic passageway, and a full-closed pneumatic passageway. The inner surface defines a piston chamber. The vent opening extends through the actuator body from a first position in the piston chamber. The full-open pneumatic passageway extends through the actuator body from a second position in the piston chamber and is configured to selectively receive the pneumatic actuation force. The full-closed pneumatic passageway extends through the actuator body from a third position in the piston chamber and is configured to selectively receive the pneumatic actuation force. The opening piston is movably disposed within the piston chamber between the vent opening and the full-open pneumatic passageway. The opening piston stop extends through the actuator body and engages the opening piston when the full-open pneumatic passageway is not receiving the pneumatic actuation force. The opening piston stop is adjustable relative to the opening piston. The closing piston is movably disposed within the piston chamber between vent opening and the full-closed pneumatic passageway. The closing piston stop extends through the actuator body and engages the closing piston when the full-closed pneumatic passageway is not receiving the pneumatic actuation force. The closing piston stop is adjustable relative to the closing piston. The first lost-motion link is coupled to the opening piston and is operable to selectively rotate the valve element. The second lost-motion link is coupled to the closing piston and is operable to selectively rotate the valve element. The opening piston is moveable between an opening piston first position and an opening piston second position. The opening piston is in the opening piston first position when the full-open pneumatic passageway is not receiving the pneumatic actuation force, and the opening piston in the opening piston second position when the full-open pneumatic passageway is receiving the pneumatic actuation force. The closing piston is moveable between a closing piston first position and a closing piston second position. The closing piston is in the closing piston first position when the full-closed pneumatic passageway is not receiving the pneumatic actuation force, and the closing piston in the closing piston second position when the full-closed pneumatic passageway is receiving the pneumatic actuation force.

Furthermore, other desirable features and characteristics of the valve and valve actuator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
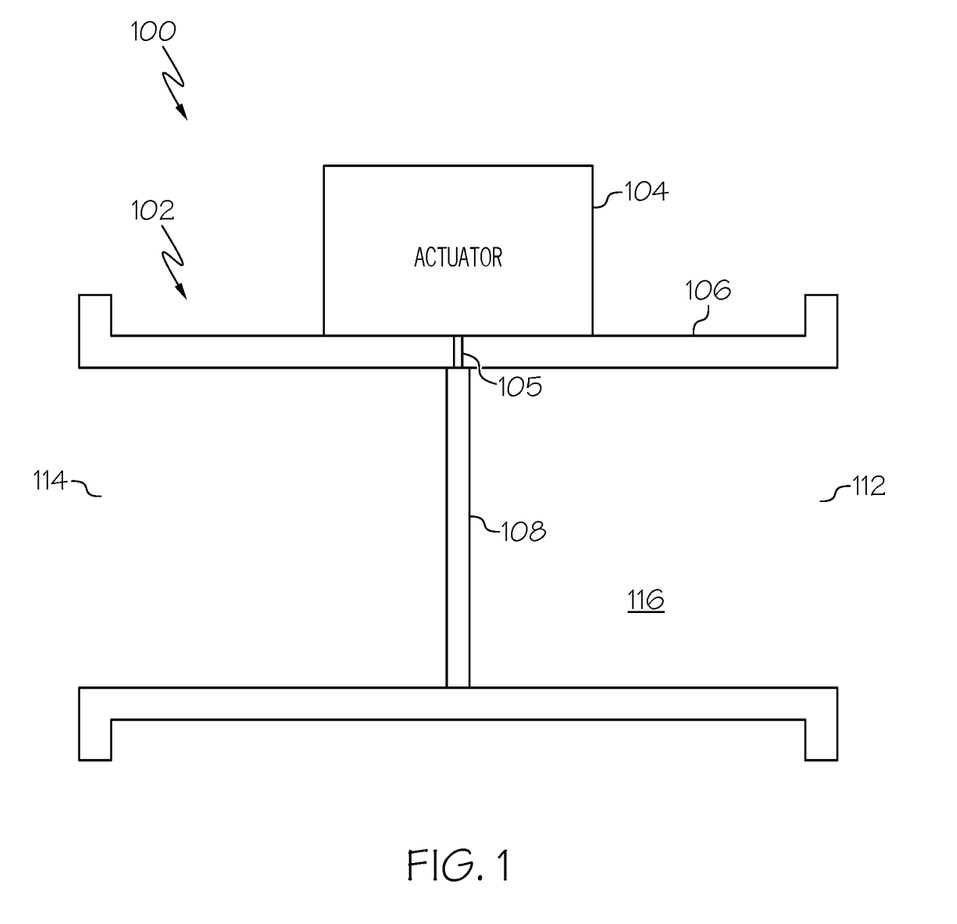
FIG. 1 depicts a simplified schematic representation of one embodiment of a valve.

Referring to FIG. 1, a simplified functional diagram of one embodiment of a pneumatically-actuated, three-position valve assembly 100 is depicted. The valve assembly includes a valve 102 and a valve actuator 104. The valve 102 includes a valve body 106 and a valve element 108. The valve body 106 includes an inlet 112, an outlet 114, and a flow passage 116 extending between the inlet 112 and the outlet 114.

The valve element 108 is rotationally mounted on the valve body 106 and is disposed within the flow passage 116. The valve element 108 is rotatable between a preset partial-open position, a full-open position, and a full-closed position. In the preset partial-open position, fluid is allowed to flow through the flow passage 116. In the full-open position, fluid is also allowed to flow through the flow passage 116. However, for the same fluid conditions, fluid flow through the flow passage 116 in the preset partial-open position is at a first flow rate, and fluid flow through the flow passage 116 in the full-open position is at a second flow rate, where the second flow rate is greater than the first flow rate. In the full-closed position, fluid is preferably prevented, but is at least substantially restricted, from flowing through the flow passage 116.

The actuator 104 is coupled to the valve element 108, via, for example, a valve shaft 105, and is configured to selectively receive a pneumatic actuation force. The actuator 104 is further configured to move the valve element 108 between the preset partial-open position, the full-open position, and the full-closed position. More specifically, the actuator 104 is configured to move the valve element 108 to the preset partial-open position when the pneumatic actuation force is not being received, and to move the valve element to one of the full-open position or the full-closed position when the pneumatic actuation force is being received. The actuator 104 may be variously configured to implement this functionality. One particular embodiment of the actuator 104 is depicted in FIG. 2, and with reference thereto, will now be described.

The depicted actuator 104 includes an actuator body 202, an opening piston 204, a closing piston 206, a first lost-motion link 208, and a second lost-motion link 212. The actuator body 202 includes an inner surface 214, a vent opening 216, a full-open pneumatic passageway 218, and a full-closed pneumatic passageway 222. The inner surface 214 defines a piston chamber 224, within which the opening piston 204, the closing piston 206, the first lost-motion link 208, and the second lost-motion link 212 are all disposed. The vent opening 216 extends through the actuator body 202 from a first position in the piston chamber 224, and fluidly communicates the inlet 112 (not shown in FIG. 2) with the piston chamber 224. The full-open pneumatic passageway 218 extends through the actuator body 202 from a second position in the piston chamber 224 and is configured to selectively receive the pneumatic actuation force. The full-closed pneumatic passageway 222 extends through the actuator body 202 from a third position in the piston chamber 224 and is also configured to selectively receive the pneumatic actuation force.

The opening piston 204 is movably disposed within the piston chamber 224 between the vent opening 216 and the full-open pneumatic passageway 218, and the closing piston 206 is movably disposed within the piston chamber 224 between the vent opening 216 and the full-closed pneumatic passageway 222. Thus, the opening piston 204 is moveable, within the piston chamber 224, in response to a differential pressure between the vent opening 216 and the full-open pneumatic passageway 218, and the closing piston 206 is moveable, within the piston chamber 224, in response to a differential pressure between the vent opening 216 and the full-closed pneumatic passageway 222.

Figure 2:
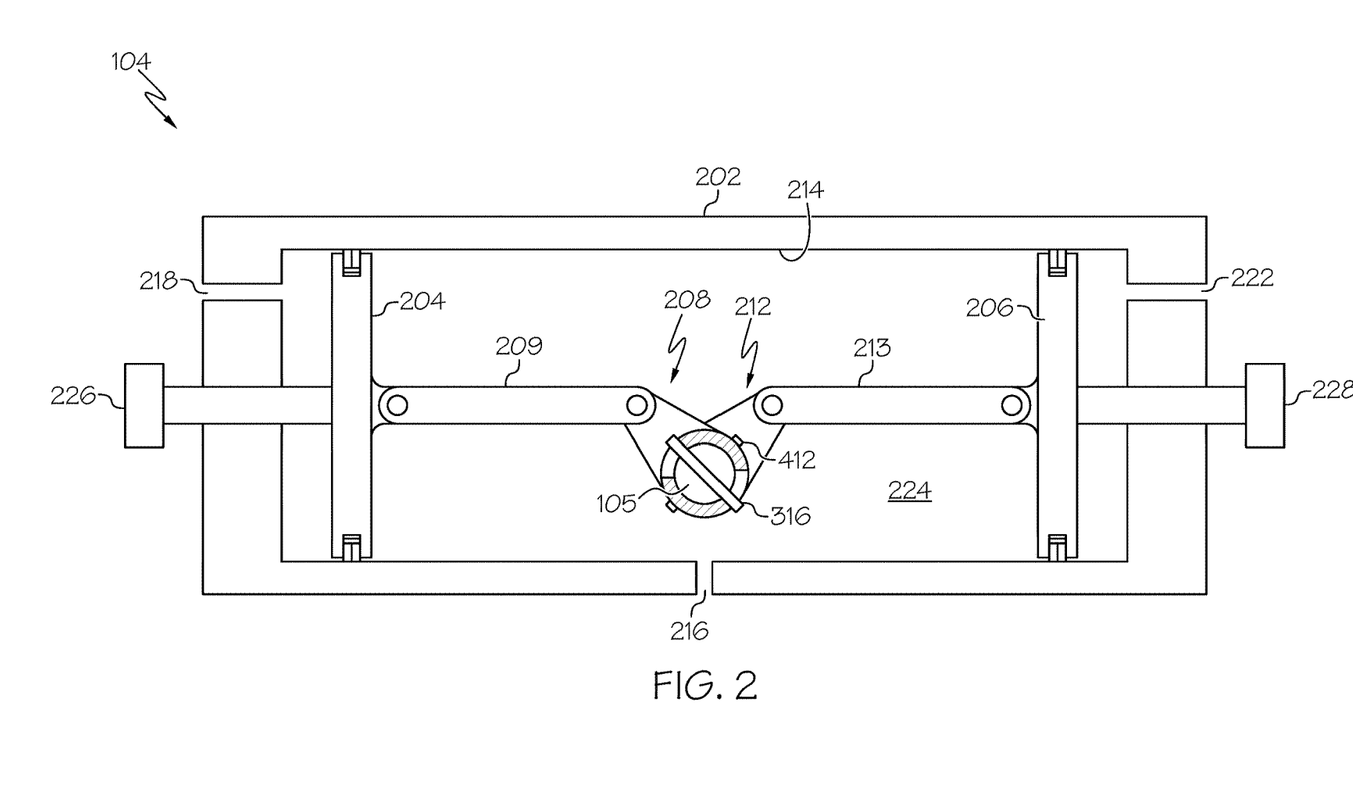
FIG. 2 depicts a schematic representation of an actuator that may be used to implement the valve of FIG. 1.
Figure 5:
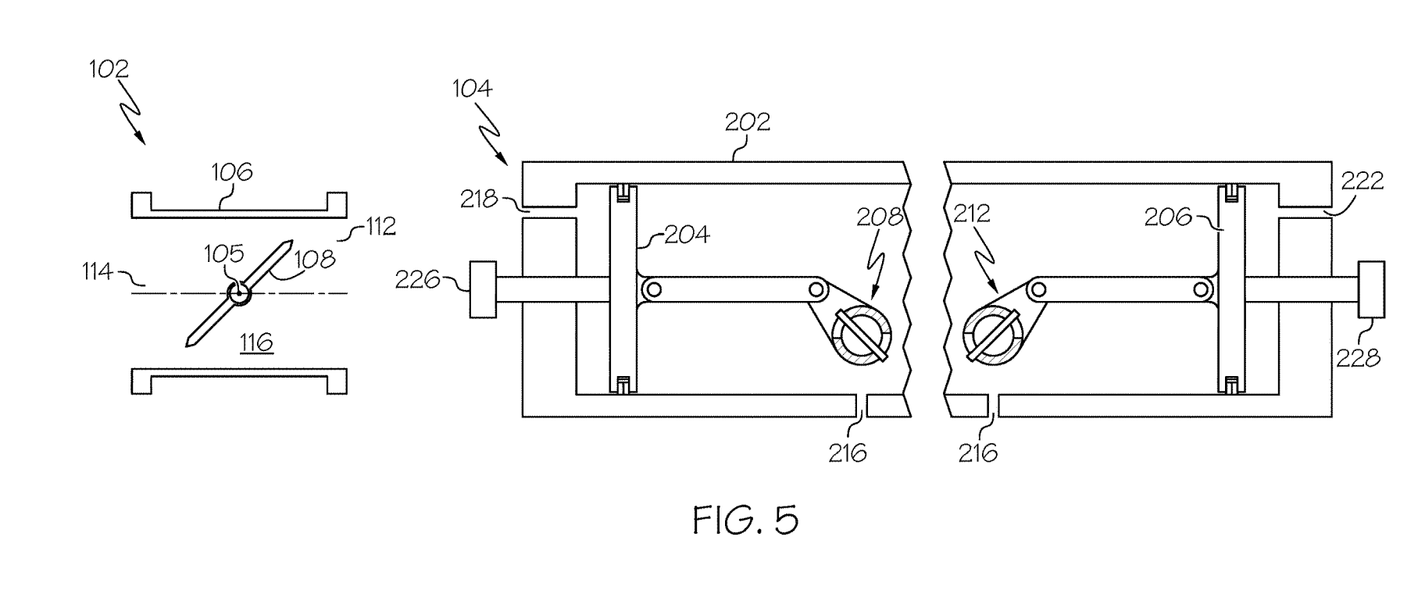
FIGS. 5-7 depict partially-disassembled schematic representations of the actuator depicted in FIG. 2 to illustrate the operation of the actuator.
Figure 6:
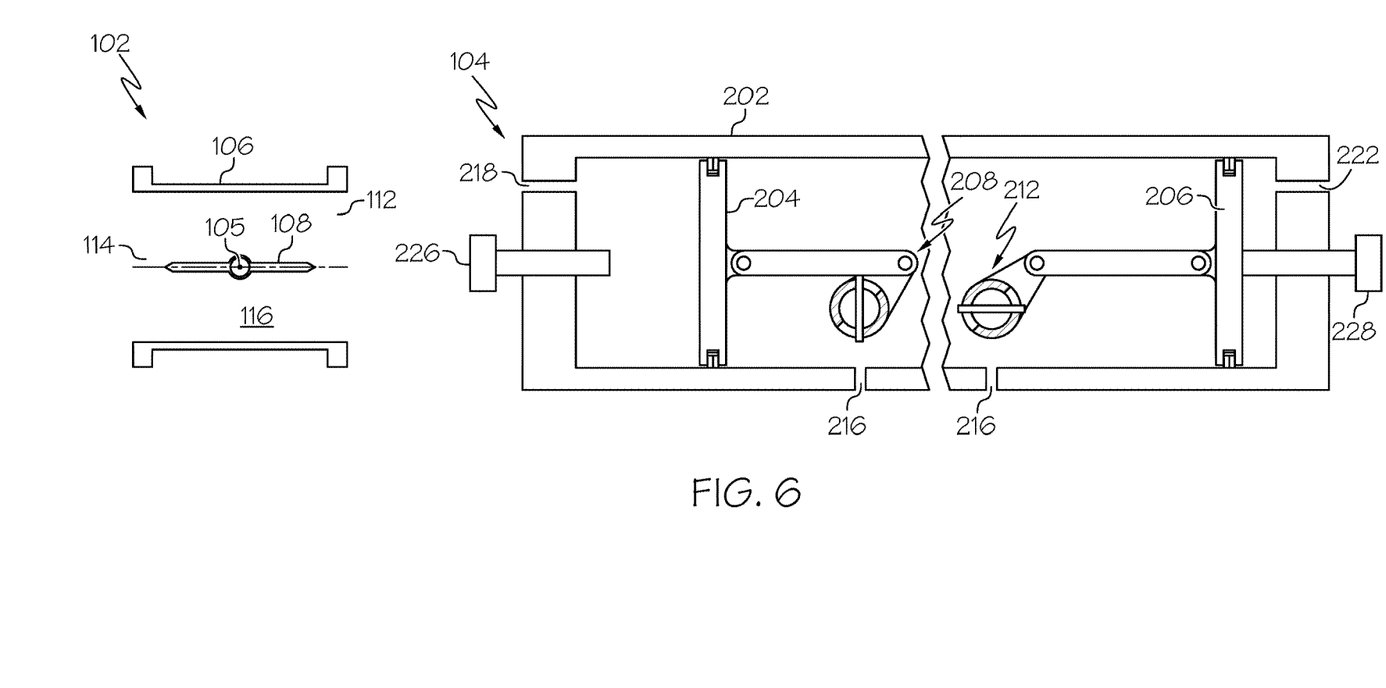
Figure 7:
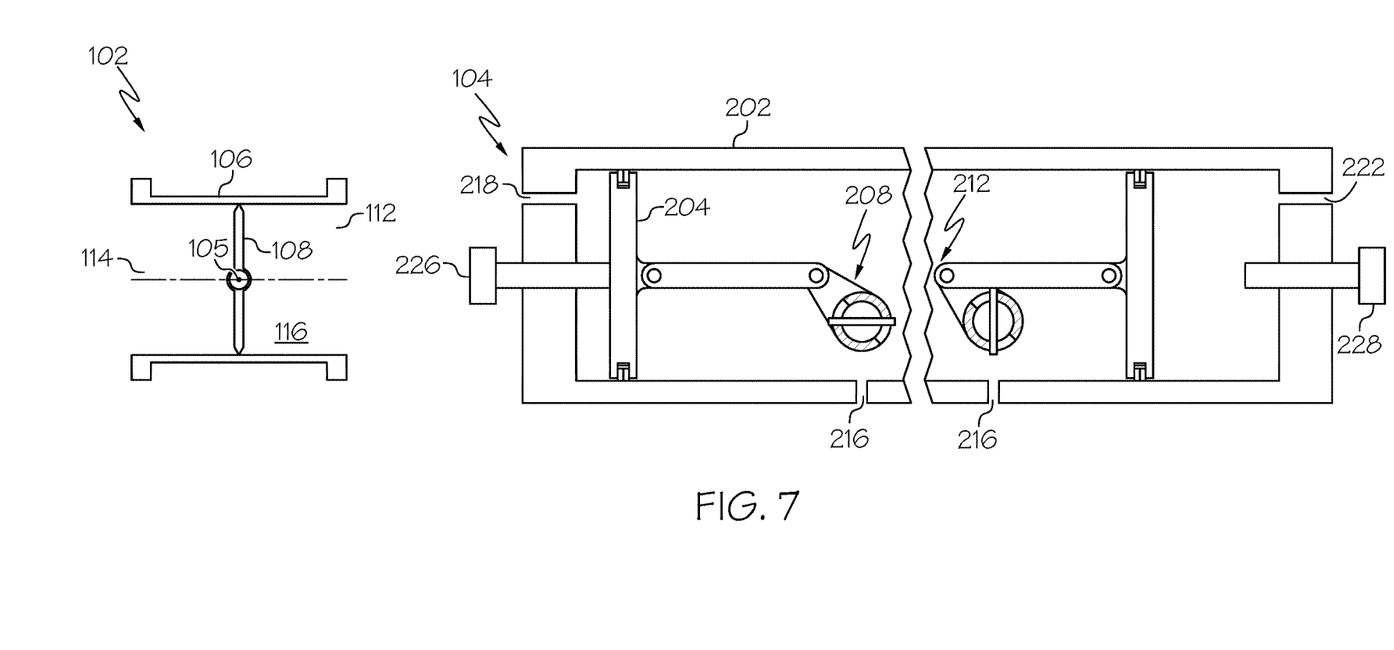

More specifically, the opening piston 204 is moveable between an opening piston first position, which is the position depicted in FIGS. 2, 5, and 7, and an opening piston second position, which is the position depicted in FIG. 6. The closing piston 206 is moveable between a closing piston first position, which is the position depicted in FIGS. 2, 5, and 6, and a closing piston second position, which is the position depicted in FIG. 7. The opening piston 204 is in the opening piston first position when the full-open pneumatic passageway 218 is not receiving the pneumatic actuation force, and it is in the opening piston second position when the full-open pneumatic passageway 218 is receiving the pneumatic actuation force. The closing piston 206 is in the closing piston first position when the full-closed pneumatic passageway 222 is not receiving the pneumatic actuation force, and it is in the closing piston second position when the full-closed pneumatic passageway 222 is receiving the pneumatic actuation force.

The first lost-motion link 208 is coupled to the opening piston 204 via a first connecting link 209, and the second lost-motion link 212 is coupled to the closing piston 206 via a second connecting link 213. The first and second lost-motion links 208, 212 are each operable to selectively rotate the valve element 108. To do so, and as shown more clearly in FIGS. 3 and 4, the first lost-motion link 212 includes a first cylindrical section 302 that surrounds a portion of, and is rotatable relative to, the valve shaft 105, and the second lost-motion link 212 includes a second cylindrical section 402 that also surrounds a portion of, and is rotatable relative to, the valve shaft 105. The first cylindrical section 302 has a first slot 304 formed therein, and the second cylindrical section 402 has a second slot 404 formed therein. The first slot 304 has first and second opening pin engagement surfaces 306, 308 that are separated from each other by a first angular distance. The second slot 402 has first and second closing pin engagement surfaces 406, 408 that are separated from each other by a second angular distance. In the depicted embodiment, the first and second angular distances are equal. In other embodiments, these angular distances may be unequal.

Figure 3:
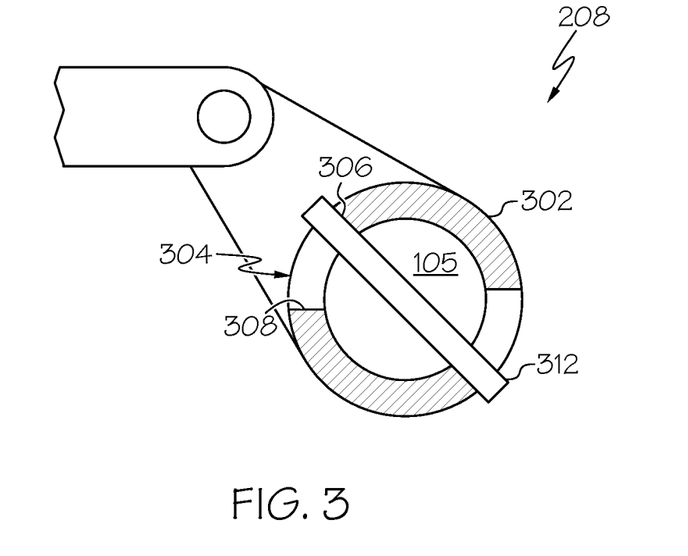
FIGS. 3 and 4 depict close-up views of one embodiment of lost-motion linkage arrangements that may be used to implement the actuator of FIG. 2.
Figure 4:
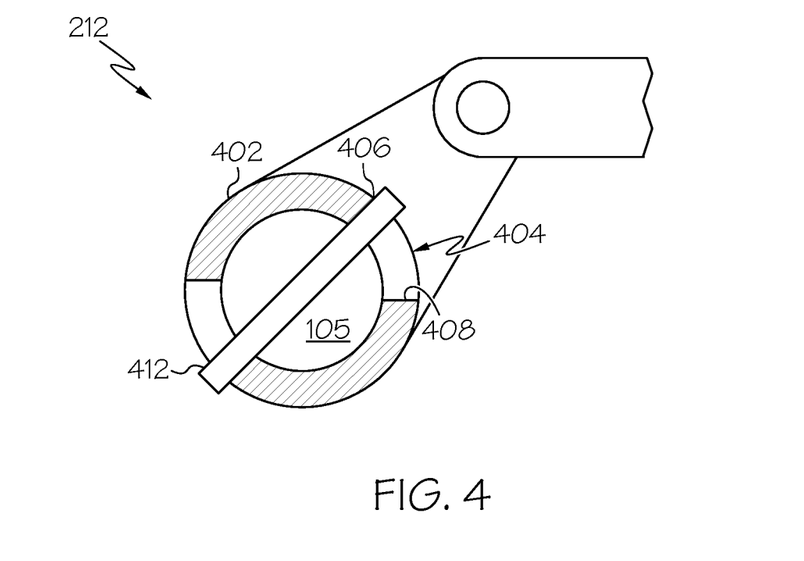

Before proceeding further, and as FIGS. 3 and 4 further depict, a pair of pins extend through the valve shaft 105. These pins include an opening pin 312 and a closing pin 412. The opening pin 312 extends radially through the valve shaft 105 and through the first slot 304, and is selectively engaged by one of the first and second opening pin engagement surfaces 306, 308. The closing pin 412 is spaced apart from the opening pin 312 and also extends radially through the valve shaft 105, and is selectively engaged by one of the first and second closing pin engagement surfaces 406, 408.

As will be described momentarily, the configuration of the first lost-motion link 208 is such that it causes the valve shaft 105 to rotate the valve element 108 out of the preset partial-open position toward the full-open position only after the opening piston 204 has moved to a predetermined position between the opening piston first position and the opening piston second position. Similarly, configuration of the second lost-motion link 212 is such that it causes the valve shaft 105 to rotate the valve element 108 out of the preset partial-open position toward the full-closed position only after the closing piston 206 has moved to a predetermined position between the closing piston first position and the closing piston second position.

Before describing the operation of the actuator 104 in more detail, and with reference once again to FIG. 2, it is seen that the actuator 104, at last in the depicted embodiment, additionally includes an opening piston stop 226 and a closing piston stop 228. The opening piston stop 226 extends through the actuator body 202 and engages the opening piston 204 when the full-open pneumatic passageway 218 is not receiving the pneumatic actuation force. The closing piston stop 228 extends through the actuator body 202 and engages the closing piston 206 when the full-closed pneumatic passageway 222 is not receiving the pneumatic actuation force. In the depicted embodiment, the opening piston stop 226 and the closing piston stop 228 are each adjustable relative to the opening piston 204 and the closing piston 206, respectively, and are configured to adjust the preset partial-open position of the valve element 108. The opening piston stop 226 and the closing piston stop 228 may also be used to adjust out hysteresis in the valve assembly 100.

Turning now to FIGS. 5-7, the operation of the actuator 104 to move the valve from the preset partial-open position to the full-open and full-closed positions will now be described. Referring first to FIG. 5, the valve element is shown in the preset partial-open position. This is because, as noted above, the vent opening 216 is in fluid communication with the flow passage 116, and because both the full-open pneumatic passageway 218 and the full-closed pneumatic passageway 222 are vented. As a result, the fluid pressure in the flow passage 116 causes the opening piston 204 to move to the opening piston first position and the closing piston 206 to move to the closing piston first position. As may also be appreciated, the fluid pressure acting on the opening and closing pistons 204, 206 pneumatically locks the valve element 108 in the preset partial-open position.

To move the valve element 108 to the full-open position, which is the position depicted in FIG. 6, a pneumatic actuation force is supplied to the full-open pneumatic passageway 218 while the full-closed pneumatic passageway 222 remains vented. This causes the opening piston 204 to begin moving toward the opening piston second position, while the closing piston 206 remains in the closing piston first position. However, because of the configuration of the first slot 304, the valve shaft 105 will not be rotated, and thus the valve element 108 will not begin being moved toward the full-open position, until the first lost-motion link 208 has been rotated, by movement of the opening piston 204, the first predetermined angular distance. When the first lost-motion link 208 has been rotated the first predetermined angular distance, the second opening pin engagement surface 308 engages the opening pin 312 and further rotation of the first lost-motion link 208 causes the valve shaft 105 to rotate and move the valve element 108 to the full-open position.

As FIG. 6 also depicts, the configuration of the second slot 404 is such that, when the valve shaft 105 is rotated to where the valve element 108 is in the full-open position, the closing pin 412 is rotated to engage the second closing pin engagement surface 408. Because the closing piston 206 is in the closing piston first position and against the closing piston stop 228, further rotation of the valve shaft 105, and thus the valve element 108, is prevented.

Turning now to FIG. 7, to move the valve element 108 to the full-closed position, a pneumatic actuation force is supplied to the full-closed pneumatic passageway 222 while the full-open pneumatic passageway 218 remains vented. This causes the closing piston 206 to begin moving toward the closing piston second position, while the opening piston 204 remains in the opening piston first position. However, because of the configuration of the second slot 404, the valve shaft 105 will not be rotated, and thus the valve element 108 will not begin being moved toward the full-closed position, until the second lost-motion link 212 has been rotated, by movement of the closing piston 204, the second predetermined angular distance. When the second lost-motion link 212 has been rotated the second predetermined angular distance, the second closing pin engagement surface 408 engages the closing pin 412 and further rotation of the second lost-motion link 212 causes the valve shaft 105 to rotate and move the valve element 108 to the full-closed position.

As FIG. 7 also depicts, the configuration of the first slot 304 is such that, when the valve shaft 105 is rotated to where the valve element 108 is in the full-closed position, the opening pin 312 is rotated to engage the second opening pin engagement surface 308. Because the opening piston 204 is in the opening piston first position and against the opening piston stop 226, further rotation of the valve shaft 105, and thus the valve element 108, is prevented.

The pneumatically actuated valve disclosed herein can be moved from a normal, intermediate (e.g., partial-open) position to the full-open and full-closed positions using an actuator that is relatively non-complex, and thus relatively less expensive. The disclosed configuration allows multiple positions within 90-degrees of rotation, versus greater than 90-degrees. This has the benefits associated with valve element sealing.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A valve, comprising:
    a valve body including an inlet, an outlet, and a flow passage extending between the inlet and the outlet;
    a valve element rotationally mounted on the valve body and disposed within the flow passage, the valve element rotatable between (i) a preset partial-open position, in which fluid is allowed to flow through the flow passage at a first flow rate, (ii) a full-open position, in which fluid is allowed to flow through the flow passage at a second flow rate that is greater than the first flow rate, and (iii) a full-closed position in which fluid is at least substantially restricted from flowing through the flow passage; and
    an actuator coupled to the valve element, the actuator configured to selectively receive a pneumatic actuation force and to (i) move the valve element to the preset partial-open position when the pneumatic actuation force is not being received, and (ii) move the valve element to one of the full-open position or the full-closed position when the pneumatic actuation force is being received, the actuator comprising:
        an actuator body having an inner surface, a vent opening, a full-open pneumatic passageway, and a full-closed pneumatic passageway, the inner surface defining a piston chamber, the vent opening extending through the actuator body from a first position in the piston chamber, the full-open pneumatic passageway extending through the actuator body from a second position in the piston chamber and configured to selectively receive the pneumatic actuation force, the full-closed pneumatic passageway extending through the actuator body from a third position in the piston chamber and configured to selectively receive the pneumatic actuation force;
        an opening piston movably disposed within the piston chamber between the vent opening and the full-open pneumatic passageway;
        a closing piston movably disposed within the piston chamber between vent opening and the full-closed pneumatic passageway;
        a first lost-motion link coupled to the opening piston and operable to selectively rotate the valve element; and
        a second lost-motion link coupled to the closing piston and operable to selectively rotate the valve element.

2. The valve of claim 1, wherein:
    the opening piston is moveable between an opening piston first position and an opening piston second position, the opening piston in the opening piston first position when the full-open pneumatic passageway is not receiving the pneumatic actuation force, and the opening piston in the opening piston second position when the full-open pneumatic passageway is receiving the pneumatic actuation force; and
    the closing piston is moveable between a closing piston first position and a closing piston second position, the closing piston in the closing piston first position when the full-closed pneumatic passageway is not receiving the pneumatic actuation force, and the closing piston in the closing piston second position when the full-closed pneumatic passageway is receiving the pneumatic actuation force.

3. The valve of claim 2, wherein:
    the valve comprises a valve shaft that extends into the actuator body, the valve shaft configured to rotate the valve element between the preset partial-open position, the full-open position, and the full-closed position;
    the first lost-motion link causes the valve shaft to rotate the valve element out of the preset partial-open position toward the full-open position only after the opening piston has moved to a predetermined position between the opening piston first position and the opening piston second position; and the second lost-motion link causes the valve shaft to rotate the valve element out of the preset partial-open position toward the full-closed position only after the closing piston has moved to a predetermined position between the closing piston first position and the closing piston second position.

4. The valve of claim 3, further comprising:
an opening pin extending radially through the valve shaft; and
a closing pin spaced apart from the opening pin and extending radially through the valve shaft.

5. The valve of claim 4, wherein:
the first lost-motion link comprises a first cylindrical section surrounding a portion of the valve shaft and rotatable relative to the valve shaft, the first cylindrical section having a first slot formed therein, the first slot having first and second opening pin engagement surfaces that are separated from each other by a first angular distance;
the second lost-motion link comprises a second cylindrical section surrounding a portion of the valve shaft and rotatable relative to the valve shaft, the second cylindrical section having a second slot formed therein, the second slot having first and second closing pin engagement surfaces that are separated from each other by a second angular distance;
the opening pin extends through the first slot and selectively engaged by one of the first and second opening pin engagement surfaces; and
the closing pin extends through the second slot and selectively engaged by one of the first and second closing pin engagement surfaces.

6. The valve of claim 5, wherein the first angular distance is equal to the second angular distance.

7. The valve of claim 1, wherein the vent opening is in fluid communication with the flow passage.

8. The valve of claim 1, further comprising:
an opening piston stop extending through the actuator body and engaging the opening piston when the full-open pneumatic passageway is not receiving the pneumatic actuation force; and
an closing piston stop extending through the actuator body and engaging the closing piston when the full-closed pneumatic passageway is not receiving the pneumatic actuation force,
wherein the opening piston stop and the closing piston stop are each adjustable relative to the opening piston and the closing piston, respectively, and are configured to adjust the preset partial-open position.

9. A valve actuator for moving a valve element, comprising:
an actuator body having an inner surface, a vent opening, a full-open pneumatic passageway, and a full-closed pneumatic passageway, the inner surface defining a piston chamber, the vent opening extending through the actuator body from a first position in the piston chamber, the full-open pneumatic passageway extending through the actuator body from a second position in the piston chamber and configured to selectively receive the pneumatic actuation force, the full-closed pneumatic passageway extending through the actuator body from a third position in the piston chamber and configured to selectively receive the pneumatic actuation force;

an opening piston movably disposed within the piston chamber between the vent opening and the full-open pneumatic passageway;
a closing piston movably disposed within the piston chamber between the vent opening and the full-closed pneumatic passageway;
a first lost-motion link coupled to the opening piston and configured to be coupled to the valve element; and
a second lost-motion link coupled to the closing piston and configured to be coupled to the valve element.

10. The valve actuator of claim 9, wherein:
the opening piston is moveable between an opening piston first position and an opening piston second position, the opening piston in the opening piston first position when the full-open pneumatic passageway is not receiving the pneumatic actuation force, and the opening piston in the opening piston second position when the full-open pneumatic passageway is receiving the pneumatic actuation force; and
the closing piston is moveable between a closing piston first position and a closing piston second position, the closing piston in the closing piston first position when the full-closed pneumatic passageway is not receiving the pneumatic actuation force, and the closing piston in the closing piston second position when the full-closed pneumatic passageway is receiving the pneumatic actuation force.

11. The valve actuator of claim 10, wherein:
the valve comprises a valve shaft that extends into the actuator body, the valve shaft configured to rotate the valve element between the preset partial-open position, the full-open position, and the full-closed position;
the first lost-motion link causes the valve shaft to rotate the valve element out of the preset partial-open position toward the full-open position only after the opening piston has moved to a predetermined position between the opening piston first position and the opening piston second position; and
the second lost-motion link causes the valve shaft to rotate the valve element out of the preset partial-open position toward the full-closed position only after the closing piston has moved to a predetermined position between the closing piston first position and the closing piston second position.

12. The valve actuator of claim 11, further comprising:
an opening pin extending radially through the valve shaft; and
a closing pin spaced apart from the opening pin and extending radially through the valve shaft.

13. The valve actuator of claim 12, wherein:
the first lost-motion link comprises a first cylindrical section surrounding a portion of the valve shaft and rotatable relative to the valve shaft, the first cylindrical section having a first slot formed therein, the first slot having first and second opening pin engagement surfaces that are separated from each other by a first angular distance;
the second lost-motion link comprises a second cylindrical section surrounding a portion of the valve shaft and rotatable relative to the valve shaft, the second cylindrical section having a second slot formed therein, the second slot having first and second closing pin engagement surfaces that are separated from each other by a second angular distance;
the opening pin extends through the first slot and selectively engaged by one of the first and second opening pin engagement surfaces; and the closing pin extends through the second slot and selectively engaged by one of the first and second closing pin engagement surfaces.

14. The valve actuator of claim 13, wherein the first angular distance is equal to the second angular distance.

15. The valve actuator of claim 9, further comprising:
an opening piston stop extending through the actuator body and engaging the opening piston when the full-open pneumatic passageway is not receiving the pneumatic actuation force; and
an closing piston stop extending through the actuator body and engaging the closing piston when the full-closed pneumatic passageway is not receiving the pneumatic actuation force,
wherein the opening piston stop and the closing piston stop are each adjustable relative to the opening piston and the closing piston, respectively, and are configured to adjust the preset partial-open position.

16. A valve actuator for moving a valve element, comprising:
an actuator body having an inner surface, a vent opening, a full-open pneumatic passageway, and a full-closed pneumatic passageway, the inner surface defining a piston chamber, the vent opening extending through the actuator body from a first position in the piston chamber, the full-open pneumatic passageway extending through the actuator body from a second position in the piston chamber and configured to selectively receive the pneumatic actuation force, the full-closed pneumatic passageway extending through the actuator body from a third position in the piston chamber and configured to selectively receive the pneumatic actuation force;
an opening piston movably disposed within the piston chamber between the vent opening and the full-open pneumatic passageway;
an opening piston stop extending through the actuator body and engaging the opening piston when the full-open pneumatic passageway is not receiving the pneumatic actuation force, the opening piston stop adjustable relative to the opening piston;
a closing piston movably disposed within the piston chamber between the vent opening and the full-closed pneumatic passageway;
a closing piston stop extending through the actuator body and engaging the closing piston when the full-closed pneumatic passageway is not receiving the pneumatic actuation force, the closing piston stop adjustable relative to the closing piston;
a first lost-motion link coupled to the opening piston and configured to be coupled to the valve element; and
a second lost-motion link coupled to the closing piston and configured to be coupled to the valve element,
wherein:
the opening piston is moveable between an opening piston first position and an opening piston second position, the opening piston in the opening piston first position when the full-open pneumatic passageway is not receiving the pneumatic actuation force, and the opening piston in the opening piston second position when the full-open pneumatic passageway is receiving the pneumatic actuation force; and
the closing piston is moveable between a closing piston first position and a closing piston second position, the closing piston in the closing piston first position when the full-closed pneumatic passageway is not receiving the pneumatic actuation force, and the closing piston in the closing piston second position when the full-closed pneumatic passageway is receiving the pneumatic actuation force.

17. The valve actuator of claim 16, wherein:
the valve comprises a valve shaft that extends into the actuator body, the valve shaft configured to rotate the valve element between the preset partial-open position, the full-open position, and the full-closed position;
the first lost-motion link causes the valve shaft to rotate the valve element out of the preset partial-open position toward the full-open position only after the opening piston has moved to a predetermined position between the opening piston first position and the opening piston second position; and
the second lost-motion link causes the valve shaft to rotate the valve element out of the preset partial-open position toward the full-closed position only after the closing piston has moved to a predetermined position between the closing piston first position and the closing piston second position.

18. The valve actuator of claim 17, further comprising:
an opening pin extending radially through the valve shaft; and
a closing pin spaced apart from the opening pin and extending radially through the valve shaft.

19. The valve actuator of claim 18, wherein:
the first lost-motion link comprises a first cylindrical section surrounding a portion of the valve shaft and rotatable relative to the valve shaft, the first cylindrical section having a first slot formed therein, the first slot having first and second opening pin engagement surfaces that are separated from each other by a first angular distance;
the second lost-motion link comprises a second cylindrical section surrounding a portion of the valve shaft and rotatable relative to the valve shaft, the second cylindrical section having a second slot formed therein, the second slot having first and second closing pin engagement surfaces that are separated from each other by a second angular distance;
the opening pin extends through the first slot and selectively engaged by one of the first and second opening pin engagement surfaces; and
the closing pin extends through the second slot and selectively engaged by one of the first and second closing pin engagement surfaces.

20. The valve actuator of claim 19, wherein the first angular distance is equal to the second angular distance.

* * * * *